(12) United States Patent
Roh et al.

(10) Patent No.: US 8,134,779 B2
(45) Date of Patent: Mar. 13, 2012

(54) 3D IMAGE DISPLAY, ALIGNING SYSTEM AND METHOD THEREOF

(75) Inventors: Sudong Roh, Anyang-si (KR); Insu Baik, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 394 days.

(21) Appl. No.: 12/453,673

(22) Filed: May 18, 2009

(65) Prior Publication Data

US 2009/0310216 A1    Dec. 17, 2009

(30) Foreign Application Priority Data

Jun. 12, 2008 (KR) .................. 10-2008-0055428

(51) Int. Cl.
*G02B 27/26* (2006.01)
*G01B 11/00* (2006.01)

(52) U.S. Cl. ......... 359/465; 359/462; 356/401; 356/359

(58) Field of Classification Search .................. 359/462, 359/465; 349/15; 356/401, 399
See application file for complete search history.

(56) References Cited

U.S. PATENT DOCUMENTS

| | | | | |
|---|---|---|---|---|
| 6,426,812 B2 * | 7/2002 | Ichikawa et al. | ................ | 359/22 |
| 6,961,177 B2 * | 11/2005 | Sato et al. | .................... | 359/465 |
| 7,450,296 B2 * | 11/2008 | Jang et al. | .................... | 359/290 |
| 2004/0012851 A1 | 1/2004 | Sato et al. | | |
| 2005/0264904 A1 | 12/2005 | Sato et al. | | |

FOREIGN PATENT DOCUMENTS

JP    2005-266438    9/2005

* cited by examiner

*Primary Examiner* — Audrey Y Chang
(74) *Attorney, Agent, or Firm* — McKenna, Long & Aldridge, LLP

(57) ABSTRACT

Disclosed is a system for aligning a 3D image display device. The system for aligning the 3D image display device comprises: a display panel showing a left eye image and a right eye image, and having a display panel align mark at a circumference of the display panel; a plurality of 3D filter including a transparent substrate, and a retarder converting a left eye image into a first polarized light and a right eye image into a second polarized light on the transparent substrate; a plurality of 3D filter align mark having a retarder pattern formed at a circumference of the 3D filter on the transparent substrate of the 3D filter, and a reflection plate formed on the retarder pattern; and a vision system taking pictures of the display panel align marks and the 3D filter align marks.

14 Claims, 6 Drawing Sheets

Patterned Retarder    Image acquired by the Vision System

Patterned Retarder → Image acquired by the Vision System

3D IMAGE DISPLAY, ALIGNING SYSTEM AND METHOD THEREOF

This application claims the benefit of Korea Patent Application No. 10-2008-0055428 filed on Jun. 12, 2008, which is incorporated herein by reference for all purposes as if fully set forth herein.

BACKGROUND OF THE INVENTION

1. Field of the Invention

The present invention relates to 3D Image Display, an aligning system and method thereof.

2. Discussion of the Related Art

The 3D (or "Three Dimensional") video display device is a system for representing 3D video data artificially. It comprises the software for generating and/or processing 3D video and the hardware for representing the 3D video contents generated by the software.

The 3D video display device is classified in the stereoscopic display and a autostereoscopic display depending on whether the observer should wear an specific glasses or not.

As display device for the stereoscopic display system is replaced from the cathode ray tube (or CRT) to the flat panel display, the technology of stereoscopic type is developed to be optimized for the flat panel display. Typically the stereoscopic display uses polarization technology. In the polarization technology, polarization films or plates having different polarizing axes are applied to the glasses for the left and right eyes, respectively. The polarized light for the right eye is blocked by the polarization film or plate on the left eye. At the same time, the polarized light for the left eye is blocked by the polarization film or plate on the right eye. Even though the stereoscopic display system requires polarization glasses and has a lot of light loss, it can get wider view angle. Therefore, it has advantages to apply for the most common 3D display system, to develop with low cost and to make large system.

The autostereoscopic display system does not require any polarization glasses. However, it has restricted view angle so it is hard to develop for large display system such as theather system. Typically the autostereoscopic display system uses the parallex barrier technology. In the parallex barrier technology, the left image for the left eye and the right image for the right eye are alternately represented behind the apertures of which shape is thin slit shape called the barrier. Therefore, when an observer sees the images through the apertures, the left image can be seen by the left eye only and the right image can be seen by the right eye. The parallex barrier technology is not using the optical technology such as polarization technology but separating the left image and the right image with the barriers.

The most important problem for mass production in the 3D video display device is to establish the technology for aligning the 3D filter separating the lights of left image and the lights of right image on the display element.

The typical method for aligning the 3D filter with the display panel in the stereoscopic display system is to repeat the aligning operation until the image shown on the display panel is correct by operating the display panel and wearing the polarization glasses.

A company called Master Image Inc. suggested, as shown in FIG. 1, the method for aligning the parallex barrier 20 and the display panel 10 (KR Patent No. 10-0709728). In this method, with two image capturing devices (CAM1 and CAM2) apart from the display panel 1 and the parallel barrier 2 with a predetermined distance, the 3D image shown on the display panel 1 is captured. Checking the separated situation for the left image and right image of the 3D images, the alignment between the display panel 1 and the parallex barrier 2 is repeated until the alignment is satisfied with the predetermined quality.

Like this, the method for aligning the 3D filter with the display panel by deciding the image shown on the display panel with users eyes, or the method for aligning the 3D filter with the display panel by checking if the image acquiring through the vision system using 2 image capturing devices is separated with satisfying certain criteria needs to supply electric power to the display panel and to apply the data of test pattern images for checking the alignment. Therefore, the two methods are hard to establish an exactly quantized alignment level. Further, as the driving system and signal controller are required to drive the display panel of the aligning system, the equipment cost is expensive. In addition, it takes much time for aligning process so that the productivity is degraded.

SUMMARY OF THE INVENTION

The exemplary embodiment is to suggest the system and method for aligning a 3D image display device suitable for aligning the display panel with the 3D filter and for quantizing the aligning level without driving the display panel.

To achieve the advantages and merits of the exemplary embodiment, the system for aligning the 3D image display device according to exemplary embodiment comprises: a display panel showing a left eye image and a right eye image, and having a display panel align mark at a circumference of the display panel; a 3D filter including a transparent substrate and a retarder converting a left eye image into a first polarized light and a right eye image into a second polarized light on the transparent substrate; a plurality of 3D filter align marks, each of which having a retarder pattern formed at a circumference of the 3D filter on the transparent substrate of the 3D filter, and a reflection plate formed on the retarder pattern; and a vision system taking pictures of the display panel align marks and the 3D filter align marks.

The aligning method for a 3D image display device according to the exemplary embodiment comprises steps of: forming a plurality of display panel align marks at a circumference of a display panel showing a left eye image and a right eye image; forming a plurality of 3D filter align marks stacking with a retarder pattern and a reflection plate on a circumference of a 3D filter including a transparent substrate and a retarder converting a light from the left eye image into a first polarized light and a light from the right eye image into a second polarized light on the transparent substrate; and taking a picture of the display panel align marks and the 3D filter align marks.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Figure 1:
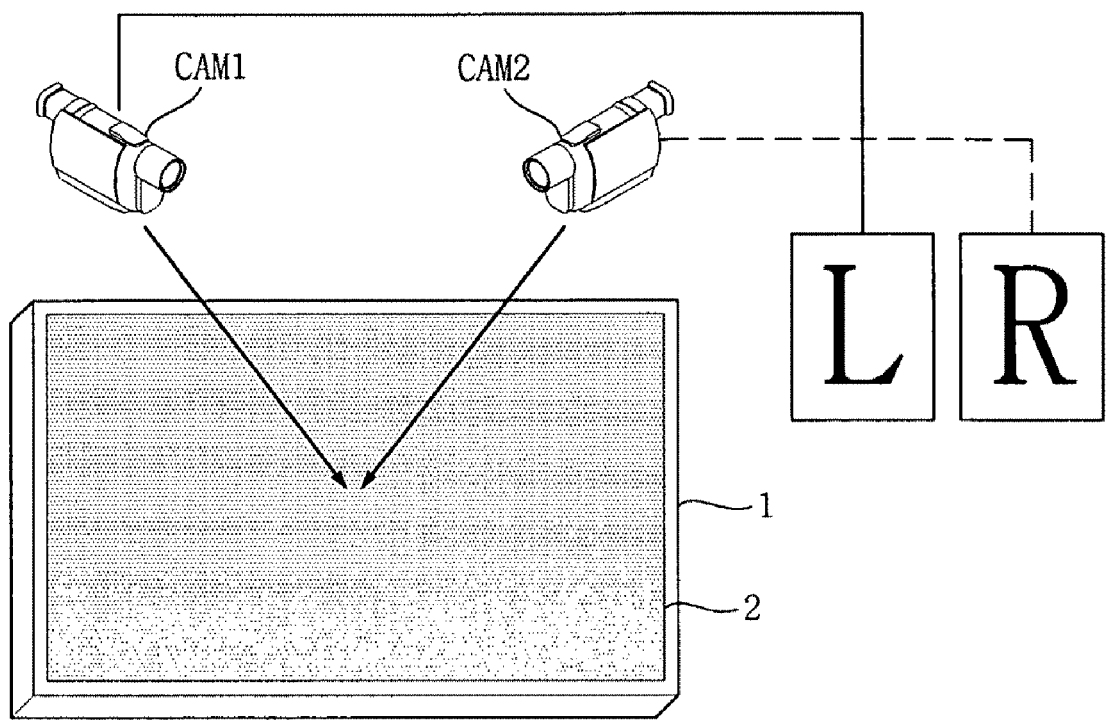
FIG. 1 illustrates the method for aligning the display panel with the parallex barrier according to the relative art.
Figure 2:
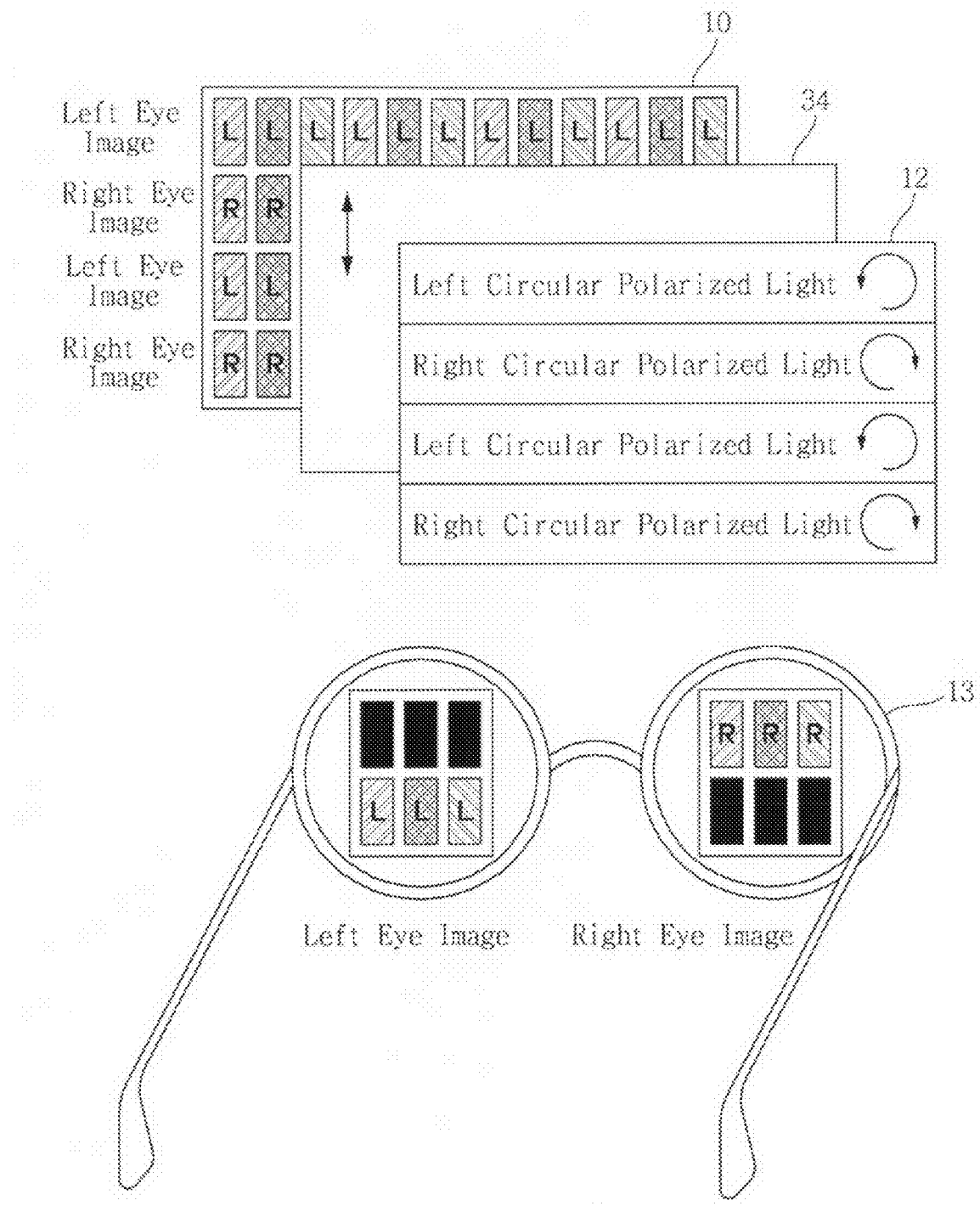
FIG. 2 illustrates the 3D image display device according to the exemplary embodiment.

Referring to the FIG. 2, a 3D image display device comprises a liquid crystal display panel 10, a polarization film 34, a 3D filter 12 and polarization glasses 13.

Instead of the liquid crystal display panel 10, the display panel may be any one of a field emission display (FED), a plasma display panel (PDP), an electroluminescence device (EL), or other type of flat display panel.

The liquid crystal display panel 10 includes a lower glass substrate having a TFT (or "Thin Film Transistor") array, an upper glass substrate having a color filter array, and a liquid crystal layer disposed between the upper and the lower glass substrates. On the outside surface of the lower glass substrate facing with a backlight unit, a lower polarization film (see FIG. 3) is attached, and on the inside surface of the lower glass substrate contacting with the liquid crystal layer, a first alignment layer for forming a pre-tilt angle of the liquid crystal material is formed. On a front surface of the upper glass substrate facing with the 3D filter 12, a upper polarization film 34 is attached, and on a rear surface of the upper glass substrate contacting with the liquid crystal layer, a second alignment layer for forming a pre-tilt angle of the liquid crystal material is formed.

On the lower glass substrate of the liquid crystal panel 10, data lines supplying data voltages to the TFT array and gate lines crossing with the data lines and sequentially supplying a gate pulse synchronizing with the data voltages are formed. On the both of the lower and the upper glass substrates of the liquid crystal display panel 10, or on the lower glass substrate, electrodes are formed for supplying electric field to the liquid crystal. These electrodes include pixel electrodes connected to the TFTs of the TFT array for supplying the data voltages and common electrodes formed on the upper glass substrate and/or the lower glass substrate for supplying the common voltage. For the vertical electric field driving type such as the twisted nematic mode (TN mode) and the vertical alignment mode (VA mode), the common electrode is formed on the upper glass substrate. For the horizontal electric field driving type such as the in-plane switching mode (IPS mode) and the fringe field switching mode (FFS mode), the common electrodes are formed on the lower glass substrate with the pixel electrodes.

The liquid crystal display panel 10 alternately shows a left image (L) and a right image (R) in the type of the line by line. The polarization film 34 is attached between the upper glass substrate of the liquid crystal display panel 10 and the 3D filter 12. As an analyzer, the polarization film 34 transmits a specific linearly polarized light among the incident light passing the liquid crystal layer of the liquid crystal panel 10.

The 3D filter 12 comprises a retarder formed on a transparent substrate. The retarder has a first retarder pattern and a second retarder pattern alternately disposed in line by line style. Each of retarder patterns retards the phase of light with λ(wavelength)/4 using the birefringence medium. The light axes of the first retarder pattern and the second retarder pattern are perpendicularly crossed each other. Therefore, the first retarder pattern is disposed so as to align with the line showing the left eye image in the liquid crystal display panel 10. As a result, the light of left eye image is changed to the left circular polarized light (or right circular polarized light). The second retarder pattern is disposed to align with the line showing a right eye image in the liquid crystal display panel 10. As a result, the light of the right eye image is changed to the right circular polarized light (left circular polarized light).

On the left eye glass of the polarization glasses 13, a polarization film which can pass the left circular polarized light (or right circular polarized light) is attached, while a polarization film which can pass the right circular polarized light (or left circular polarized light) is attached on the right eye glass of the polarization glasses 13. Thus, the observer wearing these polarization glasses 13 can see the left eye image only through the left eye and the right eye image only through the right eye, respectively. Therefore, he/she can enjoy 3-dimensional images shown on the liquid crystal display panel 10.

For aligning the liquid crystal display panel 10 with the 3D filter 12, on the lower substrate of the liquid crystal display panel 10, there are a plurality of align mark for display panel made of the same metal applied to the TFT array. Further, on the 3D filter, there are a plurality of align mark for 3D filter, on which the retarder pattern and the reflection plate are stacked.

Figure 3:
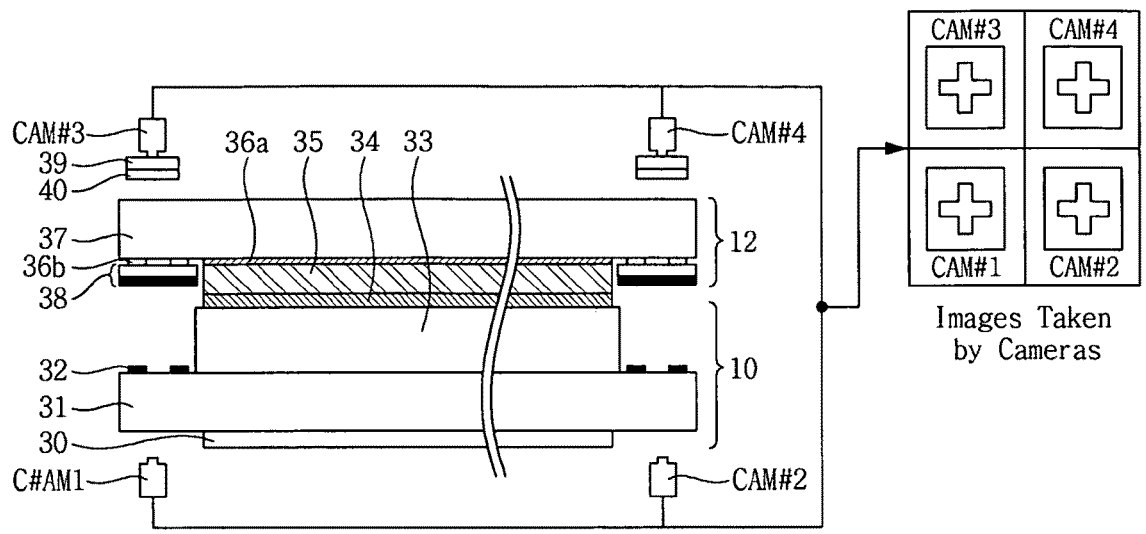
FIG. 3 illustrates an aligning system of the 3D image display device according to the first exemplary embodiment.
Figure 4:
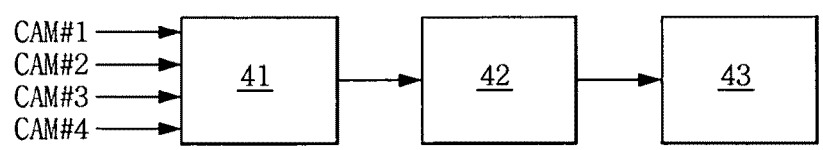
FIG. 4 is a block diagram showing the controller and the alignment driver of the aligning system for the 3D image display device shown in the FIG. 3.
Figure 5:
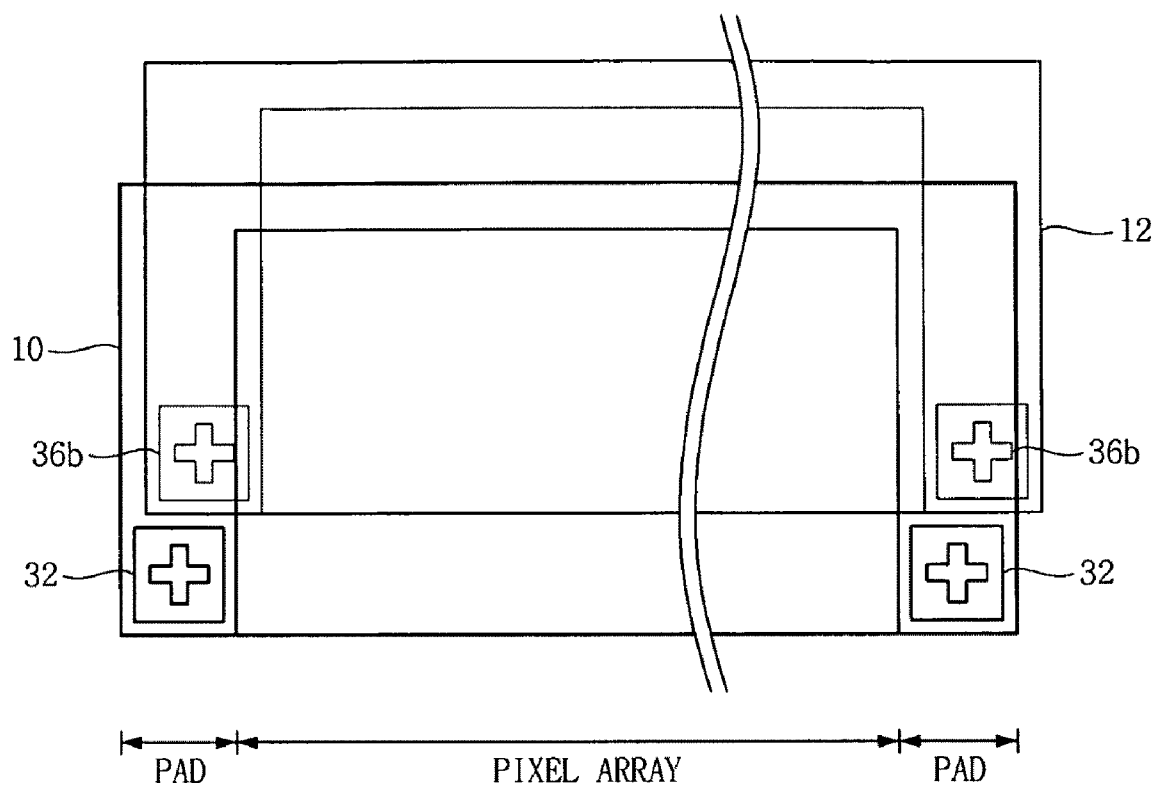
FIG. 5 is a plane view illustrating the pixel array and pad in the liquid crystal display panel and the 3D filer.

FIGS. 3 and 4 illustrate the aligning system for 3D image display device according to the exemplary embodiment. FIG. 5 illustrates the shape and position of the align marks.

Referring to FIGS. 3 to 5, the display panel align marks 32 are formed at the outside pads of the pixel array on the lower glass substrate 31 of the liquid crystal display panel 10. The display panel align marks 32 are disposed with predetermined special intervals.

According to the exemplary embodiment, the display panel align marks 32 can be formed by patterning the metal material such as, for example, aluminum (Al), aluminum neodium (AlNd), molibdenium (Mo), Chrome (Cr) and Copper (Cu) used for gate or source/drain material of the TFT array. The display panel align marks 32, as shown in FIGS. 3 and 5, are patterned with the cross shaped intaglio or other shapes.

The pixel array is the portion for showing image on the liquid crystal display panel 10 including the TFT array and the color filter array. At the pad portion at which the align marks are formed, there are a plurality of gate pad connected to the end of the gate link portion extended from the gate line of the TFT array and a plurality of data pad connected to the end of the data link portion extended from the data line of the TFT array. The gate pads are electrically connected to the output terminals of the gate drive IC (not shown). The data pads are also electrically connected to the output terminals of the data drive IC (not shown).

On the transparent substrate 37 of the 3D filter 12 facing with the upper glass substrate 33 of the liquid crystal display panel 10, the 3D filter align marks are formed at the portion facing with the pads of the liquid crystal display panel 10. Each of 3D filter align marks comprises a retarder pattern 36b and a reflection plated 38 attached to the retarder pattern 36b.

The reflection plate 38 is overlapped with the retarder pattern 36b and has larger size than that of the retarder pattern 36b.

For the best mode, the thickness of the reflection plate 38 is preferably thinner than the thickness of the adhesive 35 between the 3D filter 12 and the liquid crystal display panel 10 and than the thickness of the upper glass substrate 33 of the liquid crystal display panel 10. The 3D filter align marks are disposed with a predetermined special intervals. The special intervals between each of 3D filter align mark is the same with the special intervals between each of display panel align mark. Therefore, the number of the 3D filter align marks is the same with the number of the display panel align marks. The retarder pattern 36b of the 3D filter align marks is made of the same material as that for the retarder 36a at an image displaying portion of the 3D filter 12 corresponding to the pixel array of the liquid crystal display 10. The retarder pattern 36b is formed on the transparent substrate 37 with the retarder 36a. The retarder 36a formed at the image displaying portion of the 3D filter 12 and the retarder pattern 36b of the 3D filter align mark are transparent. Further, the retarder 36a and the retarder pattern 36b comprise a birefringence medium which can retard the phase of the light so that they have λ/4 phase retardation. The light polarization axis of the retarder pattern 36b is the same with or different from that of the retarder 36a at the image displaying portion. For example, they are perpendicular or parallel but reversed direction each other. The reflection plate 38 is stacked under each retarder pattern 36b with 1:1 ratio. The reflection plate 38 comprises a transparent substrate and a high reflection material, for example metal, coated on the transparent substrate.

The display panel align marks 32 may be patterned in a cross shape or other any shape as shown in FIGS. 3 and 5.

In the FIG. 3, the number of "30" indicates the lower polarization film attached to the lower glass substrate 31 of the liquid crystal display panel 10. The number of "33" represents the upper glass substrate of the liquid crystal display panel 10 to which the upper polarization film 34 is attached.

The aligning system of the 3D image display device according to the exemplary embodiment includes a vision system for taking a picture of align marks.

The vision system comprises, as shown in FIG. 3, a first and a second image capturing devices (CAM #1 and CAM #2) facing with the display panel align marks 32, a third and a fourth image capturing devices (CAM #3 and CAM #4) facing with the 3D filter align marks, and a light source. The image capturing devices can be CCD cameras, cameras and video cameras, etc. The vision system further comprises a polarization film 39 disposed in front of the lenses of the third and the fourth image capturing devices (CAM #3 and CAM #4) for passing the linearly polarized light, and a retarder 40 attached to the polarization film 39 at the side opposite to the side facing with image capturing devices. The polarization film 39 selectively passes the linearly polarized light in special direction. The retarder 40 includes a birefringence medium which can retard the phase of the light so that they have λ/4 phase retardation, like the retarder 36a of the 3D filter 12.

The vision system includes an align mark image analyzer 41 analyzing the align marks taken their picture by the image capturing devices (CAM #1 to CAM #4), as shown in FIGS. 3 and 4. Connecting to the image capturing devices (CAM #1 to CAM #4), the align mark image analyzer 41 converts the analogue image signals from the image capturing devices (CAM #1 to CAM #4) to the digital signals and treats the digitized images more clearly.

The light source irradiates lights to the polarization film 39 under the third and the fourth image capturing devices (CAM #3 and CAM #4). This light source can be modulized with the image capturing devices (CAM #3 and CAM #4), the polarization film 39 and the retarder 40. In addition, the light source can be separated from the image capturing devices (CAM #3 and CAM #4).

The aligning system of the 3D image display device according to the exemplary embodiment further comprises a control system. The control system includes a controller 42 and a align driver 43.

From the digital image signal from the vision system, the controller 42 calculates the tolerance between the predetermined reference point and the center point of the align marks acquired from the image capturing devices (CAM #1 to CAM #4). The controller 42 further calculates the tolerance between the center point of the display panel align marks and the center point of the 3D filter align marks. Then, the controller 42 supplies the calculated tolerances as above to the align driver 43. The align driver 43 includes an xy robot operating the stage supporting the liquid crystal display panel 10 and/or 3D filter 12 to be removed and attached to the two directions of x-axis and y-axis, and a power transmission transmitting the power of the driving source such as motor or air cylinder to the xy robot. The align driver 43 moves the liquid crystal display panel 10 and/or the 3D filter 12 to the direction along which the tolerance from the controller 42 is to be zero.

Figure 6:
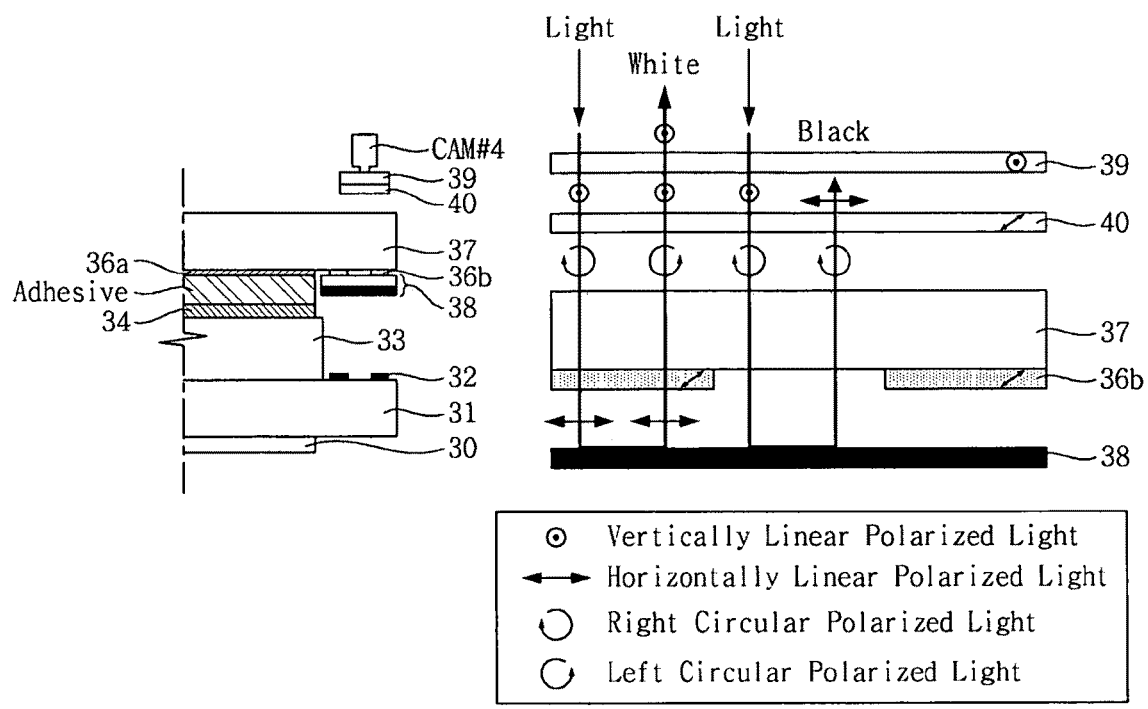
FIG. 6 illustrates the principle for acquiring the align mark of the 3D filter.

Referring to FIG. 6, the polarization film 39 has a light polarization axis passing the vertically linear polarized light. Therefore, as the light source irradiates the light to the polarization film 39 under the image capturing devices (CAM #3 and CAM #4), the light is polarized to the vertically linear polarized light by the polarization film 39. And then, the poloarized light enters into the retarder 40 placed under the polarization film 39. The retarder 40 converts the vertically linear polarized light polarized by the polarized film 39 to a right circular polarized light. The right circular polarized light converted by the retarder 40 passes through the transparent substrate 37 of the 3D filter 12 and then is converted into a horizontally linear polarized light by the retarder pattern 36b of the 3D filter align mark attached to the rear surface of the transparent substrate 37. Then, it is reflected by the reflection plate 38. The horizontally linear polarized light reflected by the reflection plate 38 is changed into a left circular polarized light by the retarder pattern 36b of the 3D filter align mark, and the left circular polarized light changed by the retarder pattern 36b of the 3D filter align mark passes through the transparent substrate 37 of the 3D filter 12. After that, it enters into the retarter 40 disposed under the image capturing devices (CAM #3 and CAM #4). The incident left circular polarized light into the retarder 40 is changed into a vertically linear polarized light by the retarder 40, passes through the polarization film 39 and then enters into the image capturing devices (CAM #3 and CAM #4).

On the contrarily, the light reflected by the portion not having the retarder pattern 36b of the 3D filter align marks does not enter into the image capturing devices (CAM #3 and CAM #4) as follows. When the light source irradiates the light to the polarization film 39 under the image capturing devices (CAM #3 and CAM #4), the light is changed into a vertically linear polarized light by the polarization film 39 and enters into the retarder 40 disposed under the polarization film 39. The retarder 40 converts the vertically polarized light from the polarization film 39 into the right circular polarized light. The right circular polarized light converted by the retarder 40 passes through the transparent substrate 37 of the 3D filter 12 and then is reflected by the reflection plate 38 with maintaining the polarization characteristics. The right circular polarized light reflected by the reflection plate 38 passes through the transparent substrate 37 of the 3D filter 12 again and then enters into the retarder 40 located under the image capturing devices (CAM #3 and CAM #4). The incident right circular polarized light into the retarder 40 is changed into the horizontally linear polarized light by the retarder 40. The polarization film 39 dispose on the retarder 40 has the light axis passing the vertically linear polarized light only. Therefore, the horizontally linear polarized light entering into the polarization film 39 after being reflected by the portions having no retarder pattern 36b of the 3D filter align marks is blocked by the polarization film 39.

Figure 7:
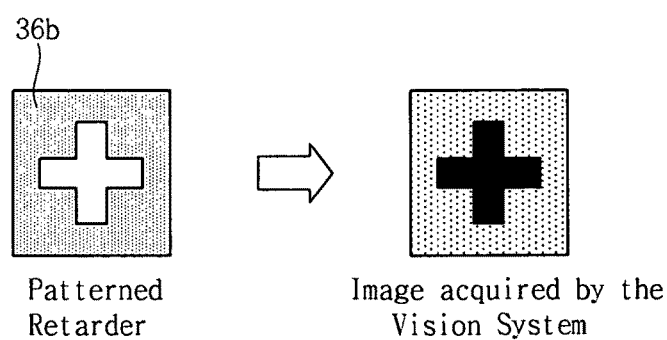
FIG. 7 illustrates a retarder pattern image acquired by the retarder pattern of the align mark of the 3D filter and the image capturing device shown in FIG. 6 according to the first embodiment of the present invention.

As there is incident light where the retarder pattern 36b is formed, as shown in FIG. 7, the third and the fourth image capturing devices (CAM #3 and CAM #4) generates the white data from the shape of the retarder pattern 36b and the black data from the other portions.

Figure 8:
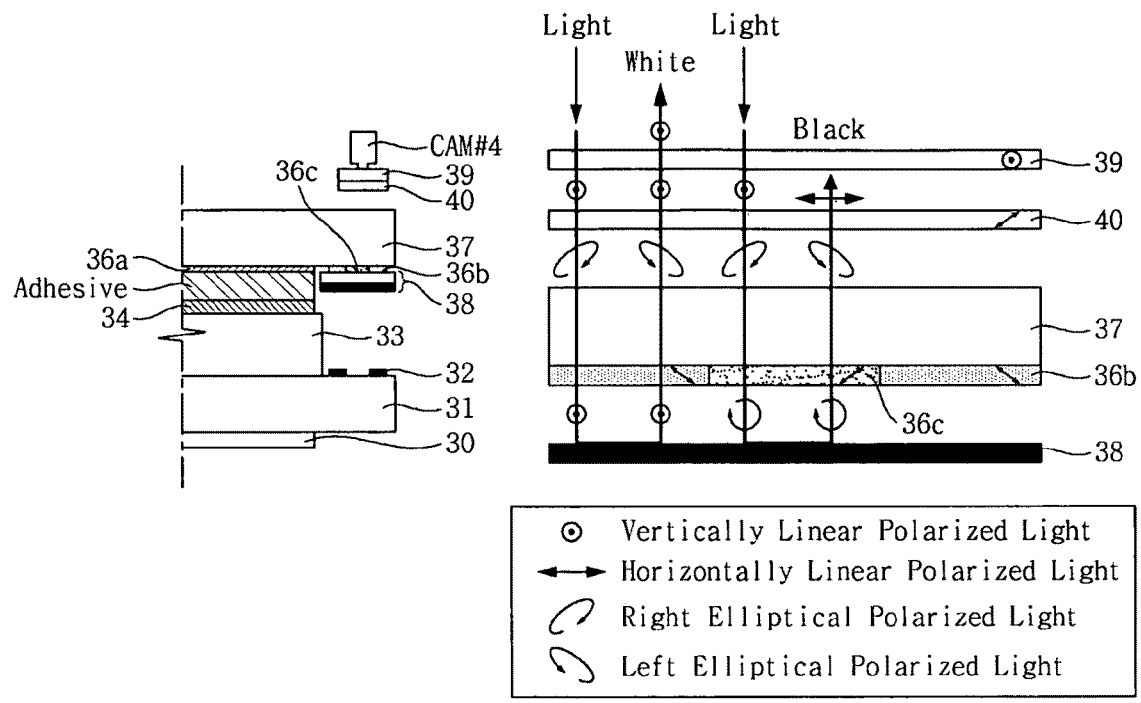
FIG. 8 illustrates an align mark of the 3D filter and the principle for acquiring the align mark according to the second exemplary embodiment.
Figure 9:
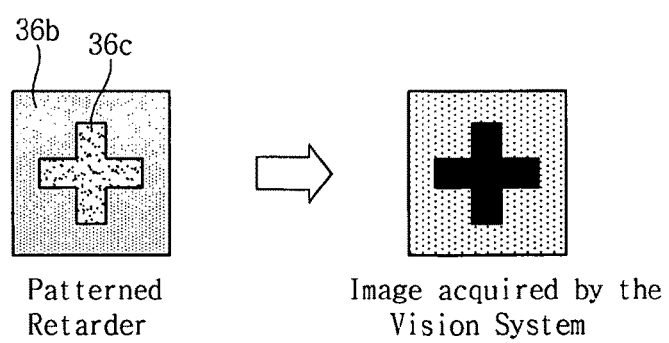
FIG. 9 illustrates a retarder pattern image acquired by the retarder pattern of the align mark of the 3D filter and the image capturing device shown in FIG. 6 according to the second exemplary embodiments.

The align system of the 3D image display device according to the second exemplary embodiment suggests a retarder pattern of the 3D filter align marks by combining the patterns having different light polarization axis as shown in FIGS. 8 and 9.

Referring to FIGS. 8 and 9, the 3D filter align marks have the phase retardation of λ/4 and comprise a first retarder pattern 36b formed on a transparent substrate 37 with a retarder 36a of the 3D filter 12. In addition, the 3D filter align marks have the phase retardation of λ/4 and comprise a second retarder pattern 36c having a polarization axis perpendicular to the polarization axis of the first retarder pattern 36b. If controlling the wavelength of the light source long as possible, an elliptical polarization can be made after the light from the light source passes through the retarder.

The method for acquiring the 3D filter align marks using the elliptical polarization will be explained as follows. The light source irradiates the light to the polarization film 39 disposed under the image capturing devices (CAM #3 and CAM #4). The light is changed into vertically linear polarized light by the polarization film 39 and enters into the retarder 40 disposed under the polarization film 39. The retarder 40 converts the vertically linear polarized light from the polarization film 39 into the right elliptical polarized light. The right elliptical polarized light converted by the retarder 40 passes through the transparent substrate 37 of the 3D filter 12, is changed into a vertically linear polarized light by the first retarder pattern 36b of the 3D filter align marks attached to the rear side of the transparent substrate 37, and is reflected by the reflection plate 38. The vertically linear polarized light reflected by the reflection plate 38 is changed into a left elliptical polarized light by the first retarder pattern 36b, passes through the transparent substrate 37 of the 3D filter 12, and enters into the retarder 40 located under the image capturing devices (CAM #3 and CAM #4). The incident left elliptical polarized light into the retarder 40 is changed into a vertically linear polarized light by the retarder 40, passes through the polarization film 39, and then enters into the image capturing devices (CAM #3 and CAM #4).

The light passing through the second retarder pattern 36c of the 3D filter align marks does not enter into the image capturing devices (CAM #3 and CAM #4) as follows. The light source irradiates the light to the polarization film 39 under the image capturing devices (CAM #3 and CAM #4). The irradiated light is converted into a vertically linear polarized light by the polarization film 39 and then enters into the retarder 40 disposed under the polarization film 39. The retarder 40 converts the vertically linear polarized light from the polarization film 39 into a right elliptical polarized light.

The right elliptical polarized light converted by the retarder 40 passes through the transparent substrate 37 of the 3D filter 12, is converted into the vertically linear polarized light by the second retarder pattern 36c, and then is reflected by the reflection plate 38. The vertically linear polarized light reflected by the reflection plate 38 passes through the second retarder pattern 36c again and then is changed into a left elliptical polarized light. After that, it passes through the transparent substrate 37 of the 3D filter 12 and enters into the retarder 40 located under the image capturing devices (CAM #3 and CAM #4). The incident left elliptical polarized light into the retarder 40 is converted into a horizontally linear polarized light by the retarder 40. The polarization film 39 disposed on the retarder 40 has the light polarization axis passing the vertically linear polarized light only. Therefore, the incident light into the polarization film 39 after passing the second retarder pattern 36c of the 3D filter align mark can not pass the polarization film 39.

As there is incident light where the first retarder pattern 36b is formed, as shown in FIG. 8, the third and the fourth image capturing devices (CAM #3 and CAM #4) generates the white data from the shape of the first retarder pattern 36b and the black data from the second retarder pattern 36c, as shown in FIG. 9.

As mentioned above, the system and method aligning the 3D image display device according to the exemplary embodiment can align the display panel with the 3D filter without operating the display panel by forming align marks at the display panel and the 3D filter, receptively and checking the align marks with the vision system. Further, it can quantizes the align level by checking the aligning condition of the align marks.

While the exemplary embodiment has been described in detail with reference to the drawings, it will be understood by those skilled in the art that the invention can be implemented in other specific forms without changing the technical spirit or essential features of the invention. Therefore, the scope of the invention is defined by the appended claims rather than the detailed description of the invention. All changes or modifications or their equivalents made within the meanings and scope of the claims should be construed as falling within the scope of the invention.

What is claimed is:

1. An aligning system for a 3D image display device comprising:
 a display panel displaying a left eye image and a right eye image, and having a plurality of display panel align marks at a circumference of the display panel;
 a 3D filter including a transparent substrate, a first retarder disposed on the transparent substrate for converting the left eye image into a first polarized light and the right eye image into a second polarized light, and a plurality of 3D filter align marks disposed at a circumference of the transparent substrate; and
 a vision system taking pictures of the display panel align marks and the 3D filter align marks,
 wherein the plurality of 3D filter align marks have a retarder pattern formed on the transparent substrate and a reflection plate formed on the retarder pattern.

2. The system according to claim 1, wherein the vision system is operated when the display panel is not operated.

3. The system according to claim 1, wherein the vision system comprises:
 a plurality of image capturing devices facing with the display panel align marks through the display panel;

a plurality of image capturing devices facing with the 3D filter align marks through the transparent substrate of the 3D filter;

a polarization film disposed between the transparent substrate of the 3D filter and the image capturing devices facing with the 3D filter align marks for passing a linear polarized light; and a second retarder formed between the polarization film and the transparent substrate of the 3D filter.

4. The system according to claim 3, wherein the first retarder and the retarder pattern have a phase of $\lambda/4$ and are transparent, here $\lambda$ is a wavelength.

5. The system according to claim 3, wherein the first retarder and the retarder pattern have the same birefringence medium.

6. The system according to claim 1, wherein the retarder pattern comprises:

a first retarder pattern having a phase retardation of $\lambda/4$;

a second retarder pattern having the phase retardation of $\lambda/4$ and a light polarization axis perpendicular to a light polarization axis of the first retarder pattern, wherein the second retarder pattern is disposed between the first retarder patterns.

7. The system according to claim 1, further comprising a light source irradiating lights to the 3D filter align marks through the transparent substrate of the 3D filter.

8. An aligning method for a 3D image display device comprising:

forming a plurality of display panel align marks at a circumference of a display panel showing a left eye image and a right eye image;

forming a plurality of 3D filter align marks stacking with a retarder pattern and a reflection plate on a circumference of a 3D filter including a transparent substrate and a first retarder converting a light from the left eye image into a first polarized light and a light from the right eye image into a second polarized light on the transparent substrate, wherein the plurality of 3D filter align marks have the retarder pattern formed on the transparent substrate and the reflection plate formed on the retarder pattern; and taking a picture of the display panel align marks and the 3D filter align marks.

9. The method according to the claim 8, wherein the taking the picture of the display panel align marks and the 3D filter align marks is performed when the display panel is not operated.

10. The method according to the claim 8, further comprising irradiating lights to the 3D filter align marks through the transparent substrate of the 3D filter.

11. A 3D image display device comprising:

a display panel displaying a left eye image and a right eye image, and having a plurality of display panel align marks at a circumference of the display panel;

a 3D filter including a transparent substrate, a first retarder disposed on the transparent substrate for converting the left eye image into a first polarized light and the right eye image into a second polarized light, and a plurality of 3D filter align marks disposed at a circumference of the transparent substrate; and wherein the plurality of 3D filter align marks have a retarder pattern formed on the transparent substrate and a reflection plate formed on the retarder pattern.

12. The device according to claim 11, wherein the first retarder and the retarder pattern have a phase of $\lambda/4$ and are transparent, here $\lambda$ is a wavelength.

13. The device according to claim 11, wherein the first retarder and the retarder pattern have the same birefringence medium.

14. The device according to claim 11, wherein the retarder pattern comprises:

a first retarder pattern having a phase retardation of $\lambda/4$; and a second retarder pattern having the phase retardation of $\lambda/4$ and a light polarization axis perpendicular to a light polarization axis of the first retarder pattern, wherein the second retarder pattern is disposed between the first retarder patterns.

* * * * *